US000001452H

United States Statutory Invention Registration [19]

[11] Reg. Number: H1452

Kennedy

[43] Published: Jun. 6, 1995

[54] INTERACTIVE INFORMATION DELIVERY SYSTEM AND METHOD OF TRAINING

[76] Inventor: Duncan Kennedy, 2216 N. Vallejo Way, Upland, Calif. 91786

[21] Appl. No.: 935,031

[22] Filed: Aug. 25, 1992

[51] Int. Cl.[6] ..... G09B 7/00

[52] U.S. Cl. ..... 434/322; 434/157; 434/169; 434/185; 434/201; 434/308; 434/309; 434/323; 434/335; 434/362

[58] Field of Search ..... 434/157, 169, 185, 201, 434/307, 308, 309, 318, 322, 323, 335, 350, 362, 365; 273/85 G, 434–438, 440–442, 460, DIG. 28; 364/410, 419; 385/152; 369/30, 33

[56] References Cited

U.S. PATENT DOCUMENTS

| | | | |
|---|---|---|---|
| 2,474,914 | 7/1949 | Purvis . | |
| 3,981,087 | 9/1976 | Sachs | 434/335 X |
| 3,986,276 | 10/1976 | Valentine . | |
| 3,986,277 | 10/1976 | Valentine . | |
| 4,232,334 | 11/1980 | Dyson . | |
| 4,337,048 | 6/1982 | Hatch et al. . | |
| 4,360,345 | 11/1982 | Hon | 434/323 X |
| 4,395,236 | 7/1983 | Gotthold . | |
| 4,490,810 | 12/1984 | Hon | 273/DIG. 28 X |
| 4,518,361 | 5/1985 | Conway | 434/362 X |
| 4,530,067 | 7/1985 | Dorr . | |
| 4,609,358 | 9/1986 | Sangster | 434/350 X |
| 4,634,386 | 1/1987 | Tamaki | 434/323 |
| 4,671,772 | 6/1987 | Slade et al. . | |
| 4,684,349 | 8/1987 | Ferguson et al. | 434/308 |
| 4,798,543 | 1/1989 | Spiece | 434/323 |
| 4,867,685 | 9/1989 | Brush et al. | 434/234 |
| 4,967,354 | 10/1990 | Buchanan | 434/350 X |
| 5,003,472 | 3/1991 | Perrill et al. . | |
| 5,033,969 | 7/1991 | Kamimura | 434/323 X |
| 5,035,625 | 7/1991 | Munson et al. | 434/362 X |
| 5,053,970 | 10/1991 | Kurihara et al. . | |
| 5,058,008 | 10/1991 | Schumacher . | |
| 5,103,408 | 4/1992 | Greenberg et al. . | |
| 5,180,309 | 1/1993 | Egnor | 434/323 |
| 5,228,859 | 7/1993 | Rowe | 434/118 |

OTHER PUBLICATIONS

Pioneer Electronic Corporation, Promotional Brochure for LD-V4200 Industrial LaserDisk TM Player, Printed in Japan, Distributed in U.S., 1988.

*Primary Examiner*—Bernarr E. Gregory

[57] ABSTRACT

An interactive information delivery system for use in computer-based training is disclosed. The system has a laser disc player which reads training materials from a laser disc to produce high-quality video pictures and training text, etc. Operation of the laser disc player is controlled by a computer which accepts student input data from a keypad. Responsive to the input data, the computer issues commands such as ON, PAUSE, OFF etc. to the laser disc player, thus allowing the student to interact with the system.

5 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WELCOME TO CBT

YOU HAVE CHOSEN CLEANING
AND HOUSE KEEPING

PRESS 1 TO GO ON OR
PRESS 2 IF YOU WANT
ANOTHER MODULE

FIG. 5

CHECKPOINT ON STORE
CLEANING PROCESS

QUESTION 2: TRUE OR FALSE?

WHEN CLEANING UTENSILS, THE
WATER SHOULD BE AS HOT AS
POSSIBLE TO INCREASE
SANITATION

PLEASE ENTER
1 FOR TRUE
2 FOR FALSE

FIG. 6

INTERACTIVE INFORMATION DELIVERY SYSTEM AND METHOD OF TRAINING

TECHNICAL FIELD OF THE INVENTION

The present invention relates in general to an information delivery system which can be advantageously used for computer-based training (CBT). More particularly, the present invention relates to an information delivery system having capability for providing clear and animated graphics and also means for interacting with a user.

BACKGROUND OF THE INVENTION

Computer-based training systems heretofore known to the art are generally considered unsatisfactory because of their inability to provide clear and animated graphics. Such inability imposes a severe limit on the teachers' freedom in presenting instructional materials to their students, and is also a major reason why many students are not motivated by computer-based training.

What is needed is an information delivery system which can provide graphics with quality good enough to facilitate clear presentation of instructional materials such as dramatized, animated pictures for captivating the attention of the students. However, it is desirable that a student can interact with the system during a training session and that the cost of such system be kept to a minimum.

SUMMARY OF THE INVENTION

The present invention relates to an information delivery system which can be advantageously used for computer-based training. The system comprises a video disc player for receiving a recording medium recorded with program materials. The video disc player reads the program materials from the recording medium and produces video signals to a television for display thereon. Operation of the video disc player is controlled by a controller. The controller has a keyboard for providing interaction between the system and a user and controls the operation of the video disc player in response to input from the keyboard. Advantageously, the system can be used to provide interactive computer-based training to a user by displaying instructional materials on the television, which display is responsive to inputs from the user.

BRIEF DESCRIPTION OF THE DRAWINGS

FIG. 5 illustrates an exemplary frame shown on the television set for prompting a user identification.

FIG. 6 illustrates an exemplary quiz frame.

DESCRIPTION OF THE PREFERRED EMBODIMENT

Figure 1:
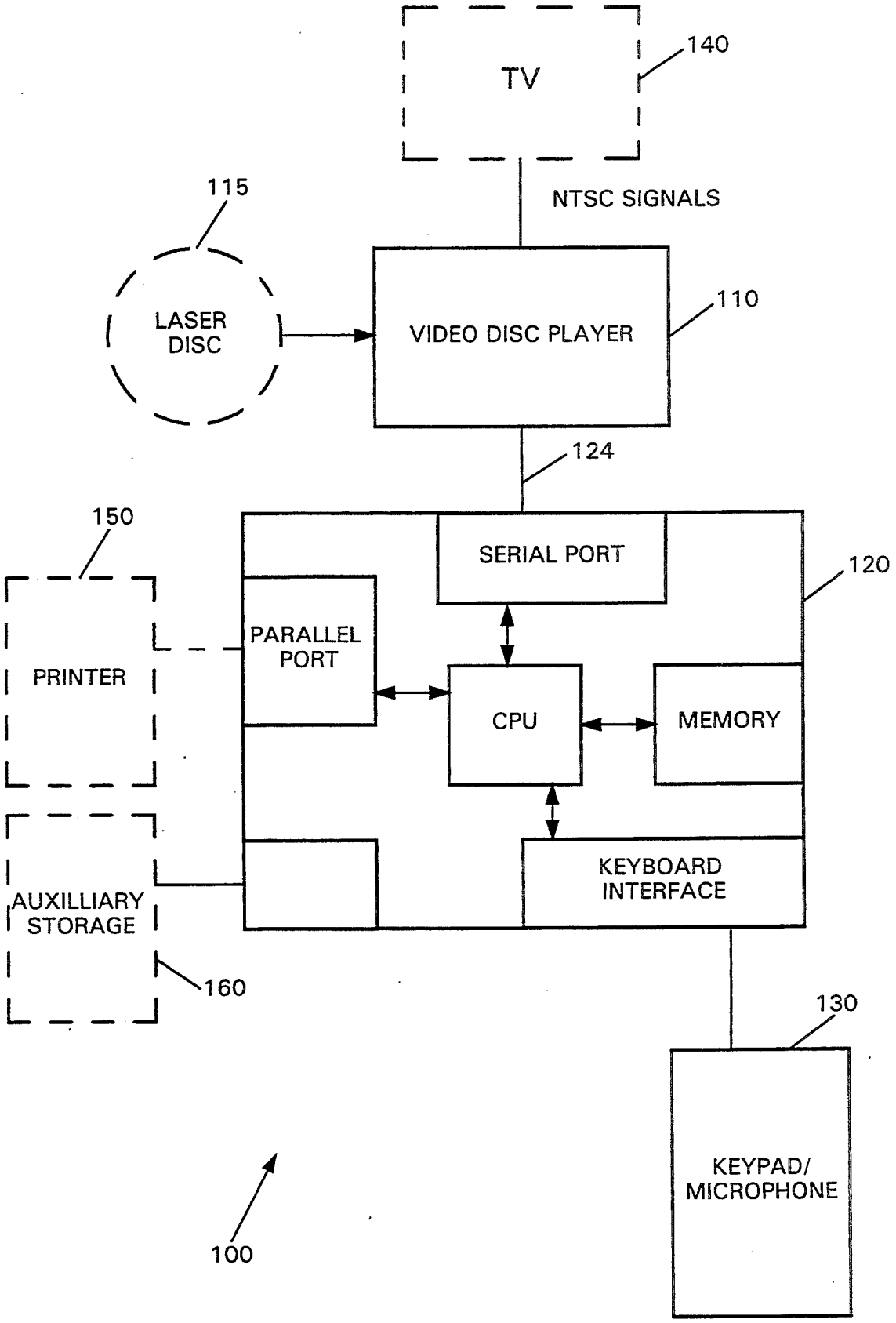
FIG. 1 is a schematic block diagram of a computer-based training system in which the present invention is embodied.

FIG. 1 is a schematic block diagram of a computer-based training system 100 embodying the present invention. The system 100 comprises a video disc player 110 such as the Pioneer LD-V2200 Industrial Laserdisc Player, a controller 120 such as an IBM PC-XT compatible personal computer and an input device 130 such as a keyboard. In operation, the video disc player 110 is connected to a television set 140 which displays video pictures generated by the video disc player 110. By using a television set connected directly to the video disc player 110 and utilizing its circuits to supply pictures to the television set, not only can clear and animated graphics be provided, the cost of the system is also reduced.

The video disc player 110 is connected to the controller 120 at a serial port of the controller 120. The connection is provided through a RS-232c connector 124. Through the RS-232c connector 124, the controller 120 controls operation of the video disc player 110 by issuing such commands as ON, PAUSE, OFF, as well commands and/or addresses for selecting different frames stored on an inserted disc for display on the television set 140.

Interaction between the system 100 and a user (student) is provided through the input device 130, such as a key-in device or a microphone, connected to the keyboard port of the controller 120. According to one aspect of the present invention, a keyboard with reduced set of keys is used so that the cost of the system 100 is minimized. One such keyboard is a Micropad, which has 17 keys organized as those found in the numeric section on the right hand side of a typical enhanced IBM PC-AT style keyboard.

The video disc player 110 has the capability of displaying a text overplay of 11 line by 20 character on the television set 140. The character display can be accessed by the controller 120 by sending commands through the RS-232C connector 124. This feature allows the controller 120 to generate text or forward text entered from the input device 130 to the video disc player 110 for display on the television set 140.

The video disc player 110 operates to receive a laser disc 115 containing training materials such as video pictures, text, menus, questions, etc. In response to control signals from the controller 120, the video disc player 110 reads the training materials, or selected elements thereof, from the disc 115 and generates NTSC (National Television Standard Committee) signals so that such materials can be displayed on the television set 140.

Optionally, a printer 150 is connected to the controller 120 at a parallel port of the controller 120. A floppy diskette drive or a hard disk drive can also be provided as an auxiliary storage device 160 of the controller 120 for additional information relating to a training program.

Figure 2:
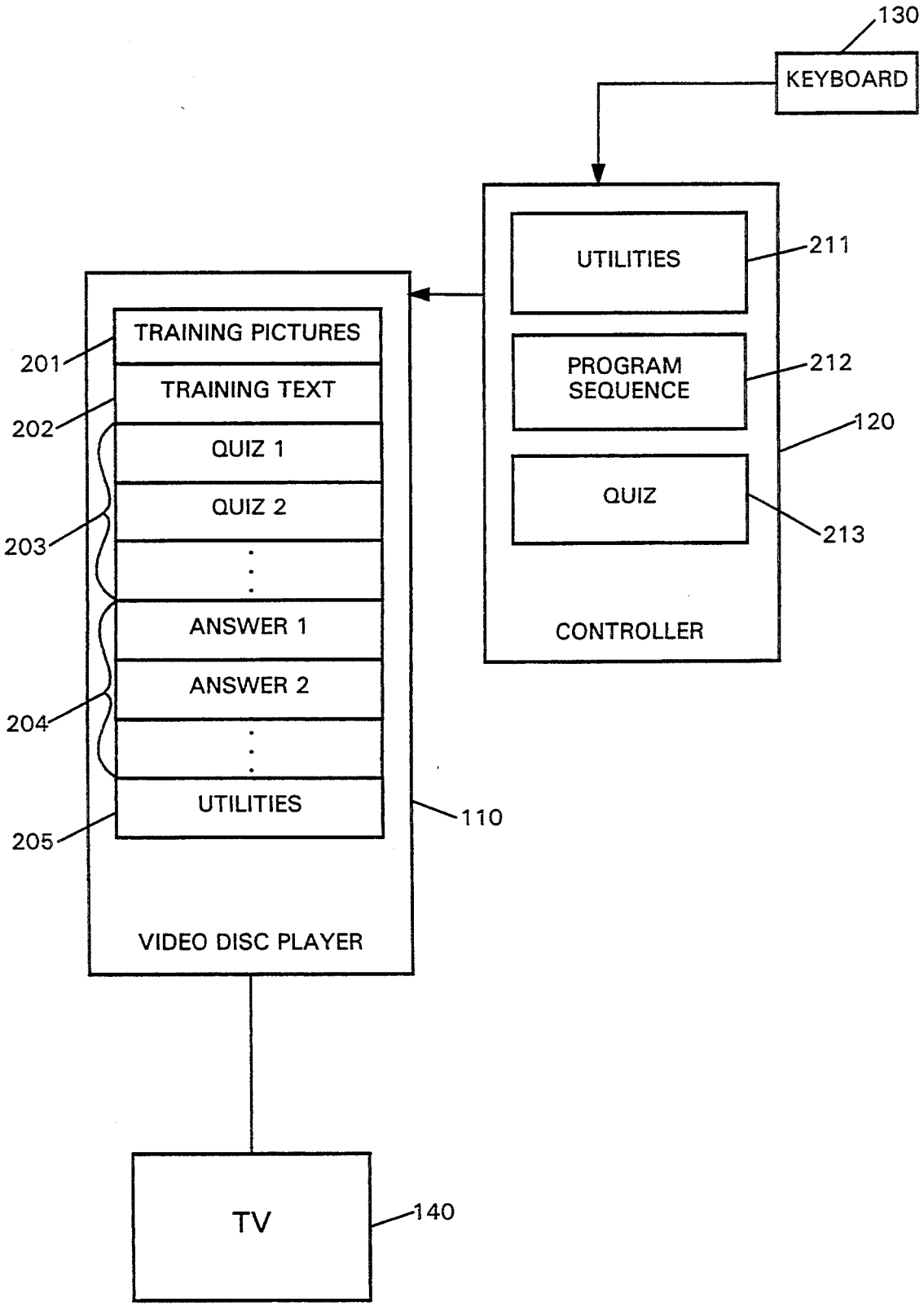
FIG. 2 is a schematic block diagram illustrating generally the software components of the system of FIG. 1 in operation.

FIG. 2 is a schematic block diagram illustrating generally the software components in the system 100 during operation. The software components recorded on a video disc in general include an identification identifying the training program to which the disc corresponds. It also contains a plurality of video frames, including one or more frame containing pictures 201 and/or text 202 of the training program. The software components recorded on a video disc also include one or more frames containing quizzes 203 relating to a particular segment of the program and one or more frames of answers 204 to the quizzes. In addition, a plurality of frames are provided for storing utility frames 205 such as, for example, message frames for instructing a user on how to operate the system 100.

The controller 120 selects which frame in a disc is to be played by the video disc player 110 by issuing commands through RS-232c interface. A plurality of files 215, 216, each corresponding to a disc, are stored in the controller. In general, each such file comprises different routines, including a plurality of utility routines 211, a program sequence routine 212 and a quiz routine 213.

In addition, a record for each registered student is also kept in the controller 120. The record can be used for tracking the progress of the student in the training.

The utility routines 211 include drivers for interfacing with the input device 130, the video disc player 110, the printer 150 and the auxiliary storage device 160, etc. Some of these drivers may be actually provided from the operating system software, e.g. DOS, of the controller 120.

The program sequence routine 212 contains sequence information relating to a training program. By way of example, a training program may comprise the step of displaying a first series of pictures on the television set 140, which is followed by a step of displaying a series of text, which is followed by a step of displaying a series of quizzes, which is followed by a step of displaying a second series of pictures and a second series of text, etc. The sequence of these operations would be listed in a table in the program sequence routine 212. In operation, this sequence is retrieved so that the different frames corresponding to the different steps are displayed successively onto the television set 140.

The quiz routine 213 controls the sequence of the quiz frames to be displayed on the television set 140. During a quiz session, the controller 120 sends a command to the video disc player 110 to select a quiz frame for display in the television set 140. A command is also sent to the video disc player 110 to freeze the display on the quiz frame. The quiz routine operates to monitor an answer from the user and also checks whether the answer given by the user is correct of not. Typically, the quizzes are multiple choice questions and calls for an answer with only a letter or number.

If the system 100 is used for providing a training program to employees of a franchise of convenience stores; a user participating in the program would first be given appropriate course materials on different modules of the program, each module being directed to a specific one of different areas (e.g. cleaning and house keeping, general responsibility, sanitation, etc.) relating to the operations of a store.

To begin a module, the user is asked to insert a video disc into the video disc player 110. The video disc can be obtained by the user from the administrator.

Figure 3A:
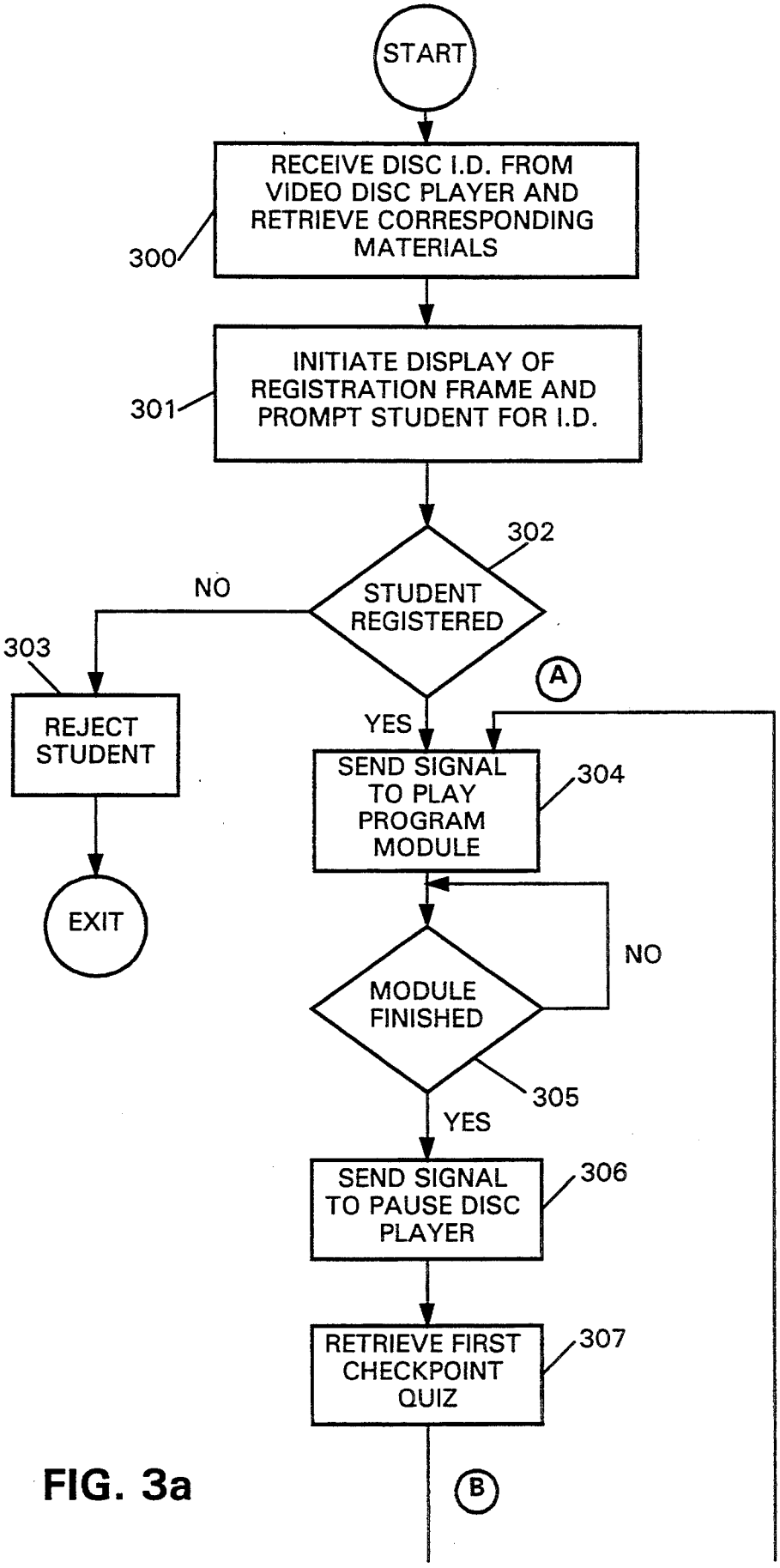
FIGS. 3*a* and 3*b* are, in combination, a flow chart illustrating typical operation of an computer-based training system embodying the present invention.
Figure 3B:
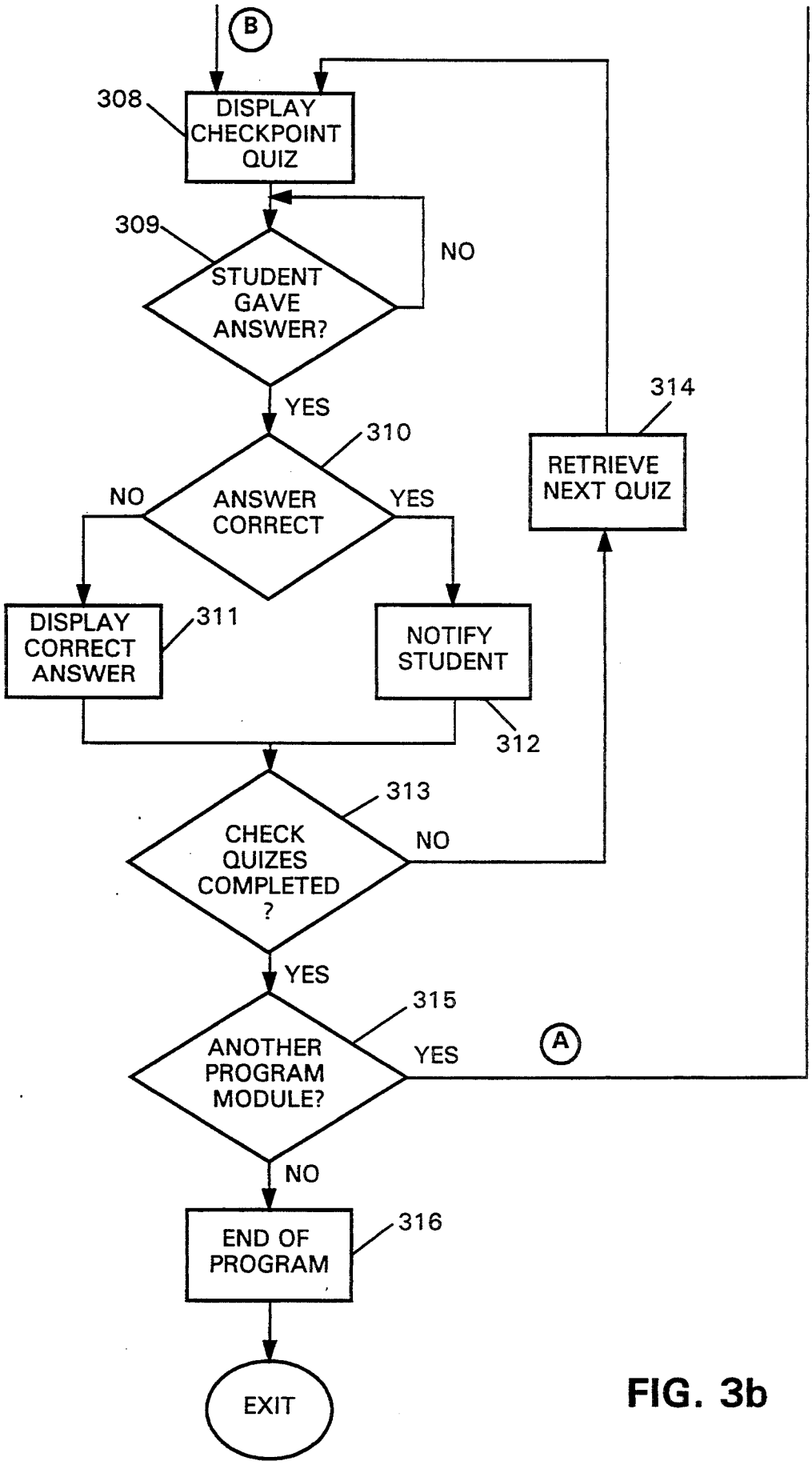
Figure 4:
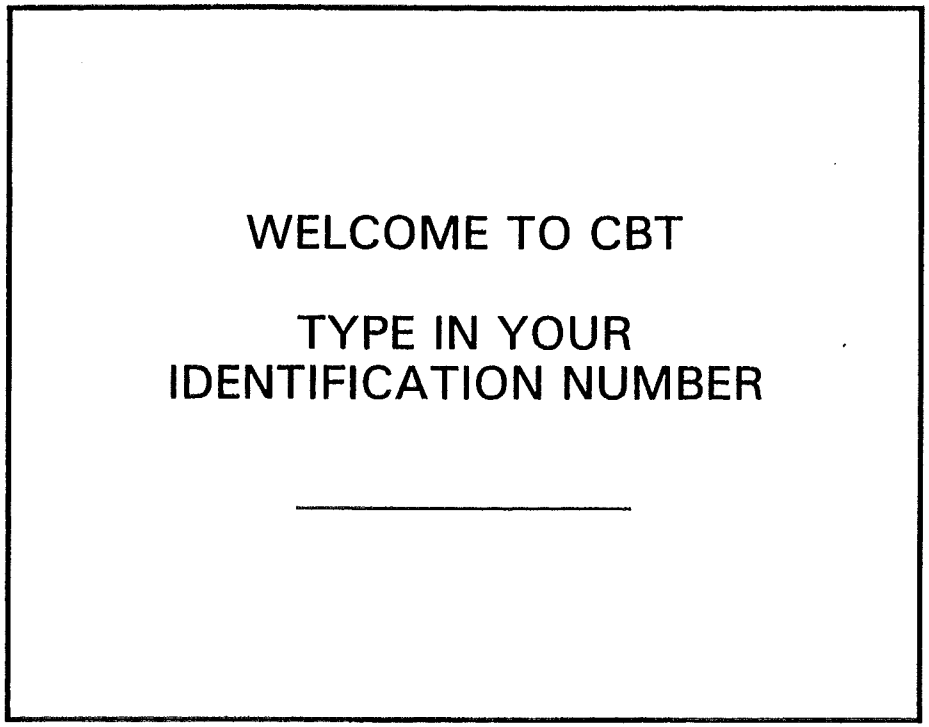
FIG. 4 illustrates an exemplary frame shown on the television set at the beginning of a training program.

FIGS. 3*a* and 3*b* are, in combination a flow chart illustrating in general the operation of the system 100 after the diskette and the video disc is inserted. The video disc player 110 first reads a predefined frame, such as the first frame, from the video disc. This frame contains an identification of the corresponding program. Thereupon, the video disc player 110 sends the identification to the controller 120. The controller uses the identification to retrieve information, such as related quizzes corresponding to the module from the auxiliary storage 160 (block 300). At the beginning of the program, the controller 120 sends commands and addresses whereby a picture frame like the one shown in FIG. 4 is retrieved from the video disc and displayed on the television set 140.

In block 301, the controller 120 executes a registration routine whereby a picture frame like the one shown in FIG. 5 is retrieved and displayed on the television set 140. It can be seen that the user is prompted by the picture frame for a user identification. When an identification is entered, the controller 120 checks whether or not the user has authorization to use the system 100 (block 302).

If the user is not authorized, he/she will be rejected from the system (block 303). A message, such as "access denied" or "xxxx not authorized" is sent by the controller 120 to the video disc player 110 for display on the television set 140.

If the user is authorized, access to the system 100 is granted and the controller 120 thereupon sends a command to the video disc player 110, along with the corresponding frame address to cause the video disc player 110 to play the first picture and/or text frame(s) (block 304). A record of the user, containing such information as the modules he has completed and/or the score of each quiz he took, can be retrieved from the auxiliary storage 160.

The controller 120 waits for the video disc player 110 to finish playing the first picture and/or text frame(s) (block 306). Thereupon, it sends signals to the video disc player 110 so that a quiz frame like the one shown in FIG. 6 is retrieved (block 307) and displayed on the television set 140 (block 308).

When a quiz is displayed, the video disc player 110 is paused and the controller 120 waits for the user to enter an answer (block 309). The user enters the answer through the input device 130. When an answer is entered, the controller 120 checks whether the answer entered is correct (block 310). The correct answer to a quiz is either stored in the memory of the controller 120 or can be retrieved from the floppy diskette which the user inserted. If the user wants a copy of the answer, a command can be issued to cause it to be printed from the printer 150.

If the answer to the quiz is incorrect, the controller 120 sends an address and command to the video disc player 110 whereby an answer frame is retrieved from the disc and displayed on the television set 140 (block 311). Alternatively, the controller 120 can itself retrieve a text from its memory or the floppy containing the correct answer and sends the text to the video disc player 110. The video disc player 110 can then cause such text to be displayed on the television set 140 using the 11 by 20 character text overplay.

If the correct answer is received, a message is sent to the video disc player 110 so that the user can be notified by a message on the television set 140.

In block 313, a check is made to see if all the quizzes are asked. If there is still one or more quiz remaining, it is retrieved (block 314) and block 308 is re-entered. If all the quizzes are presented, the system 100 checks to see if the program contains other parts that need to be presented (block 315). Optionally, the record of the student is updated to include his performance on the quizzes. If there is still one or more part to be presented, block 304 is re-entered.

When the program is completed, block 316 is entered and a message is displayed on the television set 140 notifying the user of the procedure to follow. Optionally, the record of the student is updated to reflect that he has not sufficiently completed the program.

It can be seen from the above description that the present invention store the picture and text frames of a training program on a video disc and uses a video disc player to read the frames from the disc and sends them directly to a television. As a result, the quality of the graphics is enhanced without a significant increase in the cost of the system. Interaction is made available between the user and the system because the video disc player has a text overplay capability whereby text can be sent from the controller for display on the television. A description of the particular embodiment is given above for the understanding of the present invention. It will be understood by those skilled in the art that various modifications and additions can be made without substantially departing from the scope of this invention, which is defined by the claims.

What is claimed is:

1. A method for training a student comprising the steps of:

a) providing an information delivery system comprising a video disc player, a computer connected to the video disc player, a keyboard connected to the computer, a video display connected to the video disc player and a printer;

b) playing on the video display a video lesson recorded on a video disc;

c) displaying a question on the video display relating to said video lesson;

d) inputting a student answer to the question from the keyboard to the computer; and e) printing an answer to the question.

2. The method of claim 1 further including the step of updating a student record for the student to include the performance of said student in the lesson modules.

3. A method for training a student comprising the steps of:

a) providing an information delivery system comprising a video disc player, a computer connected to the video disc player, a keyboard connected to the computer and a video display connected to the video disc player;

b) inserting a video disc into the video disc player, the video disc having recorded thereon a plurality of lesson modules, each lesson module comprising:
- a video lesson portion having pictures and text and comprising a plurality of video frames;
- a plurality of quiz frames each having a question relating to said video lesson portion;
- a plurality of answer frames each having an answer corresponding to one of said question; and
- a disc identification identifying a training program to which the disc corresponds;

c) retrieving into the computer said disc identification;

d) displaying on said video display a prompt for a student identification of the student;

e) inputting the student identification from the keyboard to the computer;

f) determining from said student identification whether the student is authorized to use the information delivery system;

g) if the student is authorized to use the information delivery system, playing one of said video lesson portion on the video display;

h) displaying and freezing on the video display one said quiz frame relating to the one of said video lesson portion;

i) inputting a student answer to the question of the one of said quiz frame from the keyboard to the computer;

j) if the student answer is correct, notifying the student that the student answer is correct;

k) if the student answer is incorrect, displaying on the video display the answer frame having the answer to the question;

l) determining whether all questions relating to said video lesson portion have been answered;

m) if all questions relating said video lesson portion have not been answered, repeating step (h) with another said quiz frame;

n) if all said questions relating said video lesson portion have been answered, determining whether all the lesson modules on said video disc have been played; and o) if all the lesson modules on said video disc have not been played, repeating step (g) with another of said lesson modules.

4. The method of claim 3 wherein the information delivery system further comprises a printer, wherein said method further comprises the step of printing an answer to a question.

5. A method for training a student comprising the steps of:

a) providing an information delivery system comprising a video disc player, a computer connected to the video disc player, a keyboard connected to the computer and a video display connected to the video disc player;

b) inserting a video disc into the video disc player, the video disc having recorded thereon a plurality of lesson modules, each lesson module comprising:
- a video lesson portion having pictures and text and comprising a plurality of video frames;
- a plurality of quiz frames each having a question relating to said video lesson portion;
- a plurality of answer frames each having an answer corresponding to one of said question; and
- a disc identification identifying a training program to which the disc corresponds;

c) retrieving into the computer said disc identification;

d) playing one said video lesson portion on the video display;

e) displaying and freezing on the video display one said quiz frame relating to the one of said video lesson portion;

f) inputting a student answer to the question of the one of said quiz frame from the keyboard to the computer;

g) if the student answer is correct, notifying the student that the student answer is correct;

h) if the student answer is incorrect, displaying on the video display the answer frame having the answer corresponding to the question;

i) determining whether all questions relating to said video lesson portion have been answered;

j) if all questions relating said video lesson portion have not been answered, repeating step (e) with another said quiz frame;

k) if all said questions relating said video lesson portion have been answered, determining whether all the lesson modules on said video disc have been played; and l) if all the lesson modules on said video disc have not been played, repeating step (d) with another of said lesson modules.

* * * * *